United States Patent [19]
Penhollow

[11] 3,731,270
[45] May 1, 1973

[54] SEISMIC EXPLORATION USING THE COMMON REFLECTION POINT TECHNIQUE

[75] Inventor: John O. Penhollow, Houston, Tex.

[73] Assignee: Esso Production Research Company

[22] Filed: Apr. 21, 1971

[21] Appl. No.: 135,957

[52] U.S. Cl. ..........................................340/15.5 CP, 340/15.5 MC, 15.5 TC
[51] Int. Cl. .................................................G01v 1/28
[58] Field of Search ...............340/15.5 MC, 15.5 CP, 340/15.5 TC

[56] References Cited

UNITED STATES PATENTS 3,597,727  8/1971  Judson et al....................340/15.5 MC
3,431,999  3/1969  Glazier............................340/15.5 CP Primary Examiner—Benjamin A. Borchelt
Assistant Examiner—N. Moskowitz
Attorney—James A. Reilly, John B. Davidson, Lewis H. Eatherton, James E. Gilchrist, Robert L. Graham and James E. Reed

[57] ABSTRACT

The common reflection point seismic technique wherein the locations of seismic disturbances and the locations of seismic wave detection stations are positioned on the same traverse, is utilized to produce a plurality of seismic records having events produced by reflections from common reflection points. A plurality of detection locations are located on one side of the first traverse and a plurality of transmitting locations are located on the other side of the traverse such that ray paths from a given disturbance location to a given detecting location will include a common reflection point. Seismic disturbances are initiated in sequence at the transmitting locations and detected at the detection locations. Seismic records thus produced are combined such that event records from common reflection points reinforce each other.

6 Claims, 3 Drawing Figures

Patented May 1, 1973

3,731,270

INVENTOR.
JOHN O. PENHOLLOW

BY John B. Jamieson

ATTORNEY

Patented May 1, 1973

JOHN O. PENHOLLOW INVENTOR.

BY *John B Davidson*

ATTORNEY

SEISMIC EXPLORATION USING THE COMMON REFLECTION POINT TECHNIQUE

BACKGROUND OF THE INVENTION

The present invention relates generally to the seismic technique for delineating geologic subsurface structures, and more particularly, to an improved method for performing the common reflection point technique to obtain continuous multiple subsurface coverage during seismic profiling operations.

Geographical areas of the earth vary greatly with respect to the quality of seismic records that may be obtained during seismic profiling operations. In some areas, it is quite difficult to obtain records on which reflection events can be readily identified, so that the records can be interpreted only with great difficulty, if at all. Surface waves energy reflected from localized reflectors and multiple reflections received from near-surface reflection horizons tend to obscure reflection events received directly from deeper reflection horizons.

Since about 1960, the so-called common depth point or common reflection point seismic technique has been almost universally used to improve the quality of seismic records so as to make the records more susceptible to interpretation. The common reflection point technique involves carefully spacing seismic disturbance or transmission locations and seismic detection or geophone locations and combining individual seismic record traces so that reflection events from common reflection points or locations on subsurface strata are additively combined to reinforce each other, and unwanted noise events are canceled. Generally speaking, transmission locations and detection locations are all along the same traverse as described in the following U. S. Pat. Nos. 2,372,906; 3,016,970; 3,381,266; 3,105,568. An exception is where areal seismic reflection coverage of subsurface reflection horizons is desired, as described in U. S. Pat. No. 3,431,999.

As can be readily appreciated, the reflection events produced by seismic waves become increasingly weak with increasing depth of the reflection interfaces responsible for the reflection events. In good data quality areas, the common depth point or common reflection point technique has made it possible to reliably identify reflection events produced by seismic wave reflection horizons as deep as 20,000 to 30,000 feet, which is well within the drilling capabilities of present technology. However, in many areas of the world, reflection events produced from reflection horizons of greater than about 20,000 feet can be identified only with great difficulty and at depths of 30,000 feet cannot be reliably identified at all.

SUMMARY OF THE INVENTION

In accordance with the invention, seismic data records having events produced by seismic waves reflected from common reflection locations which are to be summed to additively combine the events, are obtained by locating a plurality of seismic energy detecting locations along a first traverse and producing seismic disturbances at each of the plurality of locations on the traverse such that seismic energy detected at the detecting locations include reflections from common reflection locations on subsurface reflection horizons. A plurality of second seismic energy detecting locations are located along a second traverse on one side of the first traverse, and a plurality of seismic energy transmitting locations are located along a third traverse on the other side of the first traverse such that seismic wave ray paths extending from a selected transmitting location on the third traverse to any selected detecting location on the second traverse will include one of said common reflection locations. Seismic disturbances are then produced in sequence at the transmitting locations on the third traverse, and seismic waves produced thereby are detected and recorded at the detection locations on the second traverse.

Objects and features of the invention not apparent from the above discussion will become evident upon consideration of the following description thereof taken in connection with the accompanying drawings.

DESCRIPTION OF THE PREFERRED EMBODIMENT

In the actual practice of seismography, it is well known that ray paths followed by seismic energy in traversing the earth from a seismic disturbance location to a reflection horizon and back to the earth's surface to a detection location are actually not straight lines but may be thought of as a plurality of line segments having various angularities with respect to the earth's surface. To a first approximation, however, the ray paths may be considered as straight lines from the transmitting location to the reflection horizon and again from the reflection horizon to the detection location. In the ensuing discussion, this assumption will be made for the purpose of illustrating the invention without introducing complications necessarily resulting from the many layers of the earth having various seismic energy propagation characteristics.

Figure 1:
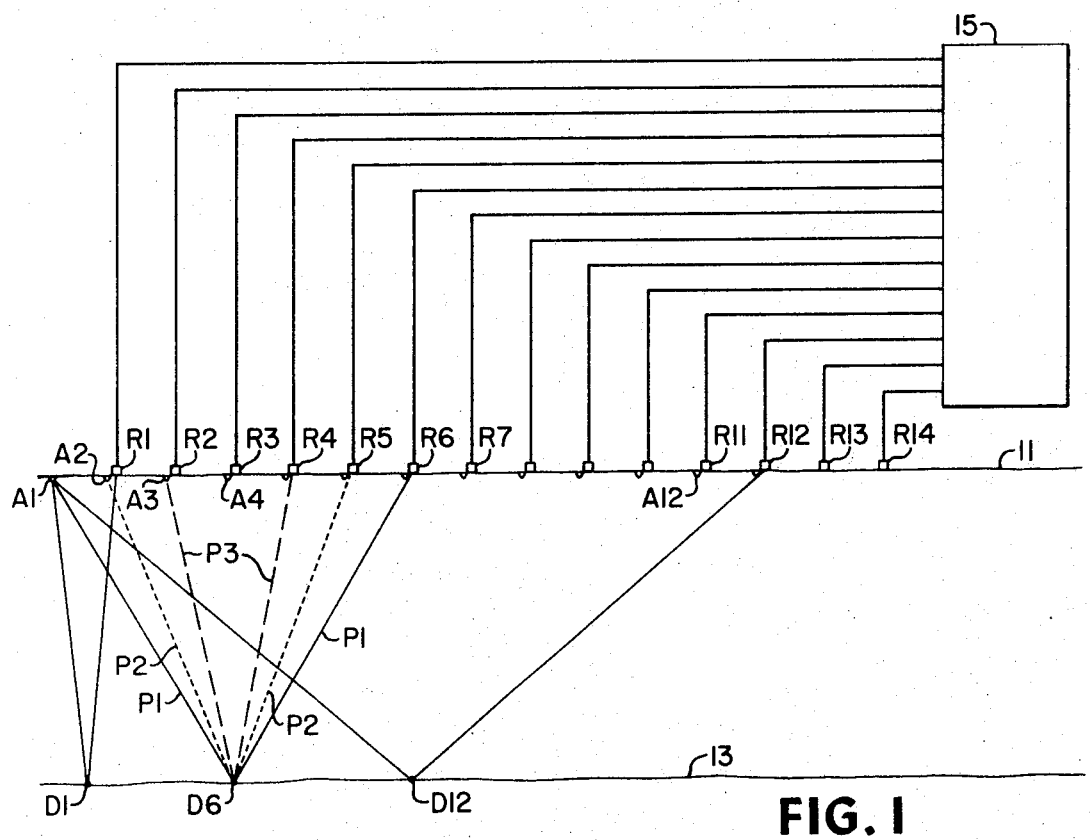
FIG. 1 is a schematic representation of a field setup in accordance with the customary common reflection point technique, illustrating one of the steps in accordance with the invention.

With reference now to FIG. 1, there is illustrated a field arrangement of the equipment for performing the common depth point seismic technique according to the usual method, which is satisfactory as an initial step of the present invention. A plurality of seismic detectors or geophones are substantially equally spaced on a traverse along the earth's surface, the locations of the detectors being substantially equally spaced apart. The detectors may be a plurality of individual geophones connected parallel and arranged in clusters at each geophone station, if such be desired. Electrical leads are connected between a seismic recorder 15 and each of the geophone stations so that the electrical signals produced at the geophone station can be recorded by the recorder. The recorder may be a DFS-3 as manufactured by Texas Instruments, Inc., Dallas, Texas, or any other type of seismic recorder well known to the art. The signals recorded thereby should be in reproducible form so that they may be selectively combined with other records of geophone signals, as will be described below. Initially, a shot hole A1 is drilled at a transmitting location which is located a distance from the detectors R1, preferably equal to a multiple of the spacing between the detector locations. In FIG. 1, the shot hole A1 is illustrated as being located a distance from detector location R1 substantially equal to the distance between the geophone locations.

A number of other shot holes A2, A3–A11, A12 are located at or in the immediate vicinity of the detecting locations of detector R1, R2–R10, R11. Manifestly, surface seismic energy sources, such as a gas exploder, may be used.

Initially, a seismic impulse is produced at transmitting location A1, as by exploding dynamite in a shot hole. The resulting seismic waves as detected by the geophones R1, R2–R11, R12 are recorded as a function of time by the seismic recorder 15. Seismic detectors R1 are then disconnected and seismic detectors R13 are added to the spread, and a seismic disturbance is produced at location R1=A2, the resulting seismic waves being again detected and recorded. This procedure is repeated as many times as desired until the desired traverse has been covered. It is manifest that the depth points on the reflecting horizon 13 produced by the first seismic observation will be between locations D1 and D12. Furthermore, as is well known, many of the depth points at which seismic waves produced as a result of the successive seismic observations are reflected will be at common locations, such as that indicated by the reference numeral D6. The ray paths of seismic waves produced by the first three seismic disturbances are indicated by the reference designations P1, P2, and P3. When the time variations produced by travel path angularity, usually termed "move-out", and time variations produced by the weathered layer and in elevation have been removed, the data records, or traces, having events produced by reflections from a common depth point may be combined so as to enhance the reflections and minimize the accompanying noise. All of this is in accordance with techniques well known to the prior art. The technique illustrated in FIG. 1 and described above is commonly termed the "roll along" technique; other techniques such as described in U. S. Pat. No. 3,105,508 - Jolly, also may be used.

Figure 2:
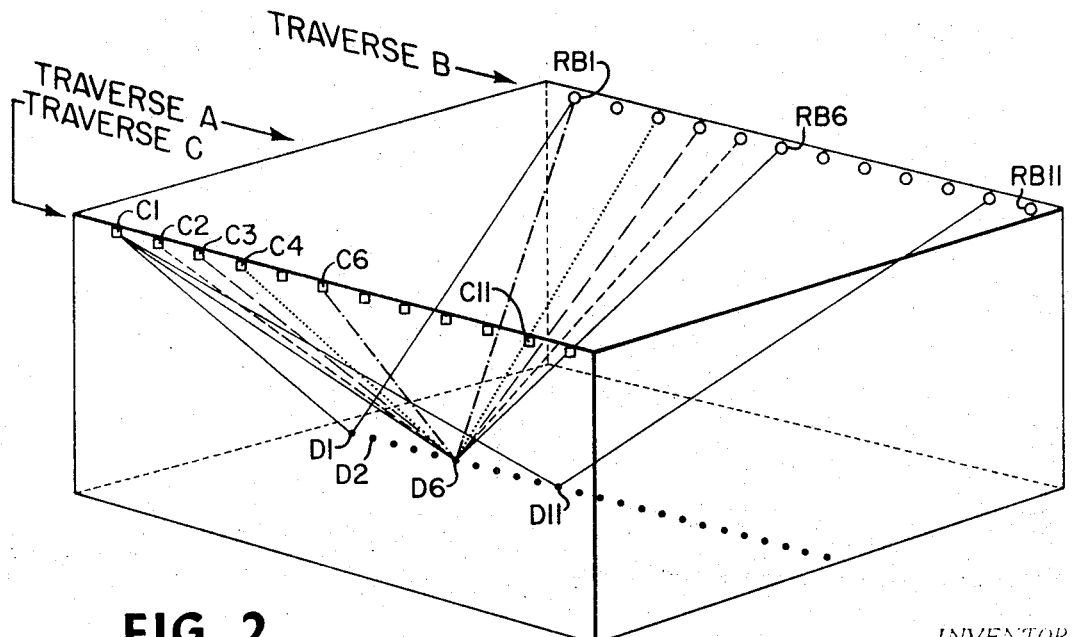
FIG. 2 is an isometric view of a portion of the earth illustrating a second step in accordance with the invention.

A second step in the technique of the present invention is illustrated in FIG. 2, wherein there is illustrated a block of the earth having a line of shot holes C1, C2–C10, C11 drilled along a traverse C and a line of detection locations RB1, RB2–RB10, RB11 located along a traverse B. The traverse A designates the traverse along which the common depth point seismic technique was practiced as in FIG. 1 with a line of depth points D1, D2–D10, D11 located along the reflection horizon 13. The spacing along the shot holes C1, C2–C10, C11 is substantially the same as the spacing between the shot holes R1, R2–R10, R11. The detection locations are positioned relative to the depth points such that the ray path from shot hole C1 to detection location R1 includes depth point D1, the ray path from C2 to R1 includes depth point D2, etc.; manifestly, depth point D6 will include the ray path between the following pairs of locations: C1-RB6, C2-RB5, C3-RB4, C4-RB3, C5-RB2, and C6-RB1. The geophones at each detecting station may be connected in series, in parallel, or in series-parallel. The geophones or clusters of geophones of various detecting locations are con-nected to a recorder 15 as illustrated in FIG. 1.

The second step can be practiced according to any of a number of techniques. For example, the first seismic disturbance can be generated at shot hole C1 and detected by detectors at detecting locations RB1, RB2–RB11, RB12. The geophones at location RB1 could then be moved to a location RB13 (not shown) adjacent location RB12. The second disturbance would then be generated at shot hole C2 and detected at the geophone locations RB2, RB3–RB12, RB13. This procedure would be repeated time after time, disconnecting from the recorder geophones at one end of the geophone spread and connecting to the recorder geophone locations at the opposite end of the spread. Alternatively, the first disturbance could be at location C6, seismic waves produced thereby being detected at detection locations RB1, RB2–RB11, RB12. The next disturbance would be at location C7 and the seismic waves produced thereby would be produced at detection locations RB2, RB3–RB12, RB13. Under either procedure, the ray paths would be reflected at reflecting points on subsurface horizon 13 that would be the same as the reflecting points produced along traverse A following the technique described with respect to FIG. 1. The procedure would be repeated as many times as necessary to produce the desired number of seismic traces having reflection events thereon indicative of depth points beneath the traverse A for the desired distance along traverse A. The traces having reflections from common depth points are then combined according to techniques well known in the art to produce composited seismic traces which may then be assembled on a composite seismogram.

It is to be noted that the ray paths produced by the step illustrated in FIG. 2 all lie on different vertical planes. This is in contrast to the situation illustrated in FIG. 1, wherein all of the ray paths are on a common plane. The resulting diversity in the portion of the earth traversed by such seismic waves following the various ray paths will be found to produce composite seismograms wherein the signal-to-noise ratio may be increased over the customary common depth point field technique results following the single traverse technique of FIG. 1.

Figure 3:
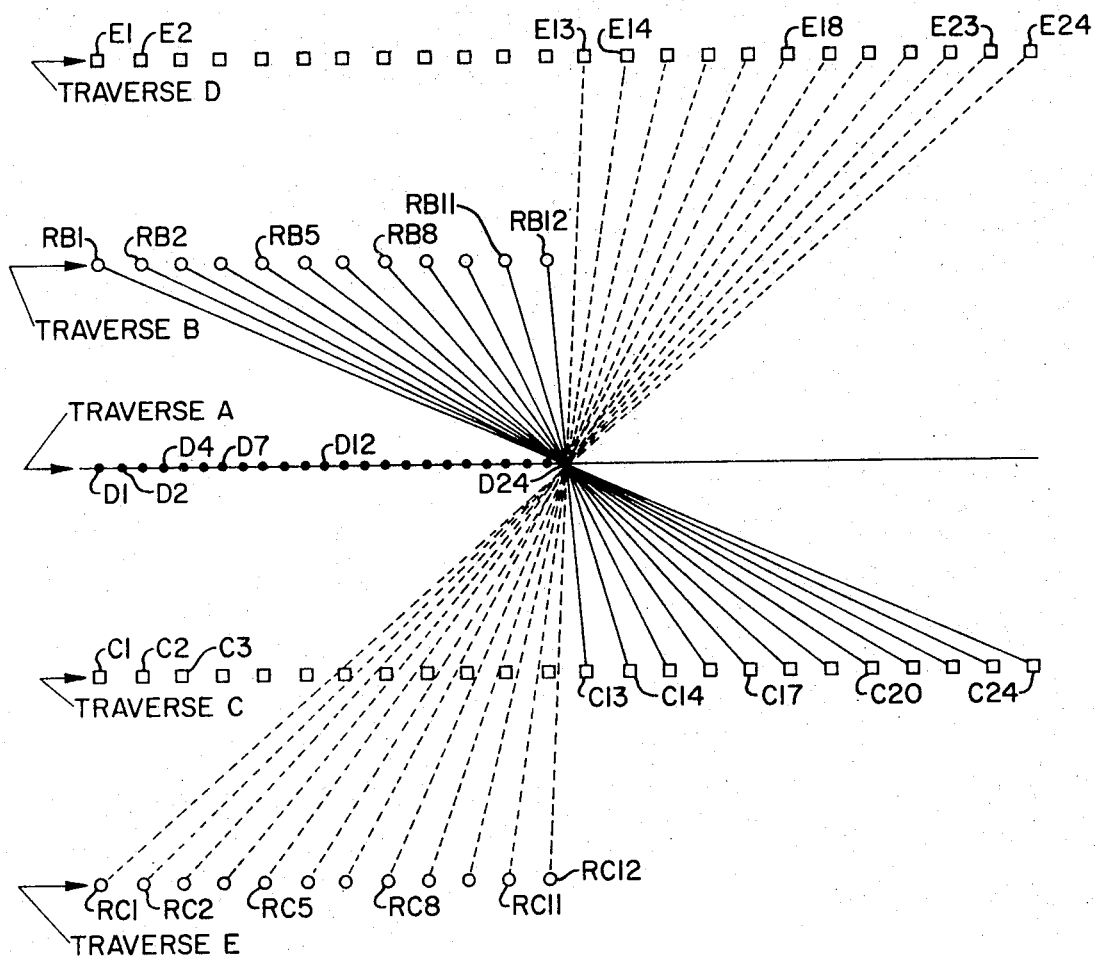
FIG. 3 is a plan view of the portion of the earth's surface illustrating ray paths between geophone and shotpoint arrays to illustrate the advantages of the invention.

An even greater signal-to-noise ratio can be obtained using the modification of the invention illustrated in FIG. 3. The traverses designated as A, B, and C are the same as similarly designated traverses in FIG. 2. Positioned along traverse D are a number of disturbance or seismic wave transmitting locations E1, E2,–E23, E24. Traverse D is located on the opposite side of traverse B from traverse A. Similarly, a traverse E along which are positioned a number of detecting or receiving locations RC1, RC2–RC11, RC12 is located on the opposite side of traverse C from traverse A. Seismic waves produced by individual disturbances along the traverse D are detected at detecting locations along traverse E. Traces produced as a result thereof are appropriately composited with traces obtained following the steps of FIGS. 1 and 2 having events thereon produced by reflections from common depth points. It will be noted that the ray paths of seismic waves detected along traverse E as a result of disturbances along traverse D are substantially greater in depth than the ray paths of seismic wave energy detected along traverse B as a result of disturbances along traverse C. Also, it will be noted that the vertical planes passing through the ray paths of seismic energy detected along traverse E will usually be different from any of the vertical planes passing through ray paths followed by the seismic energy detected at detecting locations along traverse B. As a result, the signal-to-noise ratio on the composited traces will be markedly increased.

As a result of the increase in signal-to-noise ratio obtained by following the technique of the invention, it will be found that seismic reflections can be discerned on composited traces from reflecting horizons produced by seismic energy reflected from horizon at depths of 30,000 to 40,000 feet below the earth's surface. Furthermore, events on the composited traces produced by energy reflected from shallower reflecting horizons will be much more easily discerned and separated from the noise on the traces. The overall effect on seismograms can be more easily interpreted and more accurate information can be obtained than that which has been previously possible.

It is manifest that the invention can be practiced other than as specifically described above. For example, surface sources can be used in place of dynamite in shot holes to generate seismic disturbance. Also, more than five traverses can be used in the practice of the invention, as long as the pairs of traverses are equally spaced apart on both sides of the central traverse above the line of depth points. Therefore, the invention is not to be limited except as required to properly interpret the following claims.

What is claimed is:

1. In a method of seismic prospecting wherein seismic data records having events produced by seismic waves reflected from a common reflection location are summed to additively combine said events, the improved method of obtaining said data records comprising:

locating a plurality of seismic energy detecting locations along a first traverse;

producing seismic disturbances at each of a plurality of locations on said traverse such that seismic energy detected at said detecting locations include reflections from common reflection locations on sub-surface reflection horizons;

locating a plurality of seismic energy detecting locations along a second traverse on one side of and substantially parallel thereto, and a plurality of seismic energy transmitting locations along a third traverse on the other side of and substantially parallel thereto such that seismic wave ray paths extending from selected transmitting location to any selected detecting location on the second traverse will include one of said common reflection locations; and producing seismic disturbances in sequence at transmitting locations on said third traverse, and detecting and recording seismic waves produced thereby at said detecting locations on said second traverse.

2. The method of claim 1 further including locating a plurality of seismic energy detecting locations on a fourth traverse parallel to said first, second, and third traverses, and locating a third plurality of seismic energy transmitting locations on a fifth traverse substantially parallel to said first traverse and on the opposite side thereof from said fourth traverse such that seismic wave ray paths extending from any transmitting location on said fifth traverse to any given receiving location on said fourth traverse will include one of said common reflection locations; and producing seismic disturbances in sequence at transmitting locations on said fifth traverse, and detecting and recording seismic waves produced thereby at selected detecting locations on said fourth traverse.

3. The method of claim 2 wherein said second and fourth traverses are on opposite sides of said first traverse.

4. The method of claim 1 wherein the seismic energy transmitting locations on said first traverse coincide with said seismic energy detecting locations thereon.

5. The method of claim 2 wherein vertical planes passing through ray paths extending between said second and third traverses are not coincident with vertical planes passing through ray paths extending between said fourth and fifth traverses.

6. The method of claim 5 wherein said second and fourth traverses are on opposite sides of said first traverse.

* * * * *